(12) United States Patent
Vikberg et al.

(10) Patent No.: US 8,275,379 B2
(45) Date of Patent: Sep. 25, 2012

(54) INTER-MSC HANDOVER IN A COMMUNICATIONS NETWORK

(75) Inventors: Jari Vikberg, Järna (SE); Magnus Hallenstål, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 149 days.

(21) Appl. No.: 12/674,872

(22) PCT Filed: Jun. 22, 2007

(86) PCT No.: PCT/EP2007/056242
§ 371 (c)(1),
(2), (4) Date: Jun. 2, 2010

(87) PCT Pub. No.: WO2009/000312
PCT Pub. Date: Dec. 31, 2008

(65) Prior Publication Data
US 2010/0255846 A1  Oct. 7, 2010

(51) Int. Cl.
*H04W 36/00* (2009.01)

(52) U.S. Cl. ........ 455/436; 455/437; 455/439; 455/442; 455/443; 455/445; 370/329; 370/331; 370/349

(58) Field of Classification Search .......... 455/436–451, 455/452.1, 452.2; 370/329, 331, 341
See application file for complete search history.

(56) References Cited

U.S. PATENT DOCUMENTS

| | | | |
|---|---|---|---|
| 2005/0078663 A1* | 4/2005 | Sylvain | 370/352 |
| 2005/0159158 A1* | 7/2005 | Pardeep et al. | 455/436 |
| 2006/0166694 A1* | 7/2006 | Jeong et al. | 455/525 |

FOREIGN PATENT DOCUMENTS

| | | |
|---|---|---|
| WO | WO 02/35879 A | 5/2002 |
| WO | WO 2007/004088 A | 1/2007 |

* cited by examiner

*Primary Examiner* — Wayne Cai

(57) ABSTRACT

There is provided a method and apparatus for handling handover of a mobile terminal in a mobile communications network. The mobile communications network comprises both radio access network and core network portions. Handover is from a source cell served by a source Mobile Switching Center to a target cell served by a target Mobile Switching Center. The source Mobile Switching Center generates a request for handover message and sends it to a Handover Routing Router. At the Handover Routing Router, an identity of the target cell or a target node is determined from the request, and the target cell or node identity is mapped to the address of the target Mobile Switching Center. The request for handover is then sent from the Handover Routing Router to the target Mobile Switching Center.

7 Claims, 6 Drawing Sheets

INTER-MSC HANDOVER IN A COMMUNICATIONS NETWORK

TECHNICAL FIELD

The invention relates to the field of handover in a communications network.

BACKGROUND

A cellular radio access network (RAN) is a radio network comprising a number of cells. Each cell is served by a transceiver, such as a Base Station (BS) in a Global System for Mobile Communications (GSM) network or a NodeB in an Universal Mobile Telecommunications System (UMTS)/ Wideband Code Division Multiple Access (WCDMA) network. The BSs and NodeB are further controlled by RAN controller nodes. A Base Station Controller (BSC) is a RAN controller node in a GSM network or more precisely in the GSM EDGE Radio Access Network (GERAN), and a Radio Network Controller (RNC) is a RAN controller in a UMTS network or more precisely in the Universal Terrestrial Radio Access Network (UTRAN). The cellular system is used in order to provide connectivity to subscribers of the service in a wider geographic area than could be covered by a single BS.

A Mobile Switching Centre (MSC) is a communication switch or exchange in the communication network. The MSC provides circuit switched telephony, mobility management and supplementary services to both GSM and UMTS subscribers with mobile phones roaming within the area that it serves. An MSC may serve a number of cells within the cellular network. The cells in a cellular network are further divided into Location Areas (LA) in the circuit switched domain. Each cell belongs to one LA only in the traditional GSM and UMTS networks. Additionally, one LA can only be controlled by a single MSC and this "building of logic" means that a LA can be used to uniquely identify the MSC (or pool of MSCs) that is controlling the group of cells belonging to one LA. However, one MSC may control more than one LA. A Location Area Identity (LAI) is used to identify a LA. A LAI consists of a Mobile Country Code (MCC), a Mobile Network Code (MNC) and a Location Area Code (LAC). A similar concept to LA but in the packet switched domain is the Routing Area (RA). Cells are identified in a different way in GSM and UMTS networks. In GSM networks, the cell identifier is called Cell Global Identifier (CGI) and the CGI consists of the LAI (as defined above) and a Cell Identifier (CI). In UMTS networks, the cell identifier consists of RNC-Identity (RNC-ID) and a cell identity.

When a mobile user moves between cells in a network, a handover is initiated to hand the user over from one cell to another. The handover is controlled by the RAN Controller and the decision to perform handover in the RAN Controller is based on e.g. measurement reports received from the user equipment (UE)/mobile station (MS). The network informs the UE about the neighbouring cells and the UE measures the signal strength received from these cells and reports the measurements to the RAN Controller. On some occasions, a handover will be required where the source cell and the target cell are both controlled by the same MSC. Handover between cells controlled by the same MSC is called Intra-MSC handover. On other occasions, a handover will be required in which a user will be handed over from a cell served by one MSC to a cell served by another MSC. This handover between MSCs is called Inter-MSC handover.

Referring to FIG. 1, there is illustrated schematically the architecture and principle of inter-MSC Handover. A terminal 1 is located inside one of the Location Areas (LA1) served by MSC1 (i.e. one MSC can control more than one Location Area, but only one is shown in FIG. 1). If the terminal 1 is in a Circuit Switched (CS) dedicated state, that is to say it is involved in on or more CS sessions, then Intra-MSC handovers are performed as required within LA1 as long as the terminal remains within LA1.

If the terminal 1 moves to area LA2, which is served by MSC2, then an Inter-MSC handover needs to be triggered from MSC1 to MSC2 to ensure that MSC2 becomes aware that the terminal 1 is about to move to LA2 from LA1. As described above, the handover is triggered from the RAN controller of the current cell in LA1 (also called the source cell). The RAN controller of the source cell selects the target cell and signals the need to trigger handover towards MSC1. This request contains the cell identifier of the selected target cell (e.g. a CGI for GSM cells or RNC-ID and Cell Identifier for UMTS cells). The main steps of the handover are based on the make-before-break principle which means that the needed radio resources are reserved for the UE in the target cell before the UE moves there. The main reason for this is to minimize any noticeable interrupt time for the circuit switched service during handover.

In order to find MSC2, MSC1 consults a mapping table that maps the target cell or node identity received from the RAN controller to the address of MSC2. This is termed herein 'handover routing'. In general, handover routing means that the source MSC (in this case MSC1) selects the target MSC (in this case MSC2) based on the received target cell or node identity, and initiates the signalling required for the handover towards the target MSC. Once the target MSC receives the indication about the handover request, it uses the received target cell or node information to decide which RAN controller is controlling the target cell.

The target cell or RAN controller node is identified for example by:
 A Cell Global Identifier (CGI) or any parts of the CGI for GERAN/GSM cells; and
 A Radio Network Controller identity (RNC-ID) for UTRAN/WCDMA cells.

The Handover Routing tables are logically built and used as follows:
1. The Handover target cell or target node provides the name of the target MSC that controls the target cell;
2. The target MSC name is used to obtain a signalling number 7 Destination Point Code to be used in the underlying Message Transfer Part (MTP) used for the handover.

FIG. 2 is a combination of FIGS. 5a and 6a from 3GPP TS 29.010 v6.9.0, and is a signalling diagram showing Basic Inter-MSC handover from a GERAN/GSM cell to another GERAN/GSM cell. Previously, there has only been a limited need to define MSCs in a Core Network, and only so-called 'neighbouring' MSCs (MSCs that are controlling cells in adjacent/overlapping locations) are defined. This is because handover normally occurs only in the case of a user moving from one geographic location served by one cell to a new geographic location that may be served better by another cell.

FIG. 3 illustrates further which LAs are covered by which MSCs. The handover tables held at each MSC defines adjacent MSCs. For example, the Handover Routing Table of MSC1 defines MSC2, MSC7 and MSC8, as these MSCs control cells that are adjacent to some of the cells controlled by MSC1, and therefore may be a possible target for an Inter-MSC handover from MSC1. Similarly, MSC1 is defined in the Handover Routing Tables of MSC2, MSC7 and MSC8, as MSC1 is a possible target for Inter-MSC Handover from any of MSC2, MSC7 and MSC8. The Handover Routing Table of MSC8 would need to define MSC1, MSC2, MSC3, MSC7, MSC9, MSC13, MSC14 and MSC15, as each of these are a possible target for an inter-MSC Handover from MSC8. However, the Handover Routing Table of MSC-16 does not define MSC1, since there are no neighbouring cells controlled by MSC1 to which a mobile subscriber might require handover.

This solution has worked well so far with existing GSM and WCDMAA/JMTS networks. However, there are new network scenarios and node types being developed that were not envisaged when designing Handover Routing. Examples of some new network scenarios include:

Circuit Switched over Long Term Evolution (CSoLTE) solutions where one or few Packet Mobile Switching Centres (PMSCs) could serve a whole country. A PMSC may serve both traditional 2 G/GSM and 3 G/WCDMA/UMTS radio access networks and the networks based on Circuit Switched over Long Term Evolution-capable networks.

Generic Access Network (GAN) access in different Public Land Mobile Networks (PLMNs)

Where a PLMN is purchased and it is necessary to provide Handover between the existing and new PLMNs (i.e. the existing and new PLMNs provide coverage on the same geographical area).

These new network scenarios require that all MSCs in a network will need to define all other MSCs in a network, and not simply MSCs that serve adjoining cells. In other words, Handover Routing for these new network scenarios require a full-mesh configurations in both directions (e.g. from MSC1 to MSC18 and from MSC18 to MSC1).

There are several problems with the full-mesh configuration, the main two being that it requires each MSC in a network to configure and store a large amount of data. Furthermore, it may require sharing data about MSCs in a network with MSCs in another network. Where these networks are operated by different network operators, these network operators may not wish to share all of the information required, some of which may be confidential.

SUMMARY

The inventors have realised that there will be problems for existing inter-MSC handovers when certain new network scenarios are implemented. They have devised a new node type called a Handover Routing Router (HRR). The HRR may be implemented in an existing node such as a Mobile Switching Centre, or it may be a standalone node.

According to a first aspect of the invention, there is provided a method of handling handover of a mobile terminal in a cellular radio access network from a source cell served by a source Mobile Switching Centre to a target cell served by a target Mobile Switching Centre. A request for handover is sent to a Handover Routing Router from a source Mobile Switching Centre. At the Handover Routing Router, the identity of the target cell or target node is obtained from the request. The identity of the target cell or node is mapped to an address of the target Mobile Switching Centre, and the request for handover is then forwarded from the Handover Routing Router to the target Mobile Switching Centre. This ensures that a single entity, the Handover Routing Router, maintains a record of all MSCs and cell identifiers in the network served by the Handover Routing Router. Any changes to the network architecture can be easily made at the Handover Routing Router, rather than having to reconfigure all MSCs in the network. The invention also avoids having to store information about all MSCs in the network at each MSC in the network.

The identity of the target cell or node may be mapped to an address of the target Mobile Switching Centre using a Handover Routing Table. The Handover Routing Table contains data identifying cells in the radio access network, RAN controller nodes controlling these cells, and Mobile Switching Centres in the core network controlling the radio access network.

It may be that a network operator wishes to maintain the existing handover procedures, and only use the Handover Routing Router as a fallback. In this case, the source Mobile Switching Centre may determine whether a Mobile Switching Centre Handover Routing Table stored at the source Mobile Switching Centre has a required cell or node identifier, and only forward the request to the Handover Routing Router if it does not have the required cell or node identifier.

The request for handover is typically sent as a MAP PREPARE HANDOVER Request message from the source MSC as defined in 3GPP TS 29.002 v6.15.0.

When a new Mobile Switching Centre is added to the cellular core network, the Handover Routing Table may be updated with information identifying the new Mobile Switching Centre and the cells served by the new Mobile Switching Centre or the RAN Controller nodes connected to the new MSC.

According to a second aspect of the invention, there is provided a Handover Routing Router for use in a communications network. The Handover Routing Router comprises a receiver for receiving a request for handover from a source cell to a target cell in the radio access network. The request is sent from a source Mobile Switching Centre. The Handover Routing Router further comprises a processor for determining from the request an identity of the target cell or node and means for mapping the identity of the target cell or node to an address of a target Mobile Switching Centre. A transmitter is also provided for forwarding the request for handover from the Handover Routing Router to the target Mobile Switching Centre.

The Handover Routing Router may be disposed at an interface between two Public Land Mobile Networks. This ensures that information relating to network architecture remains confidential.

According to a third aspect of the invention, there is provided a Mobile Switching Centre for use in a cellular core network. The Mobile Switching Centre comprises a processor for preparing a message requesting handover of a mobile terminal to a target Mobile Switching Centre and a transmitter for sending the message to a Handover Routing Router.

The Mobile Switching Centre may further comprise a memory for storing a list of cell and node identifiers and target Mobile Switching Centre identifiers and means for, prior to sending the message, determining that a cell or node identifier for a required target cell is not stored in the memory.

DETAILED DESCRIPTION

Figure 1:
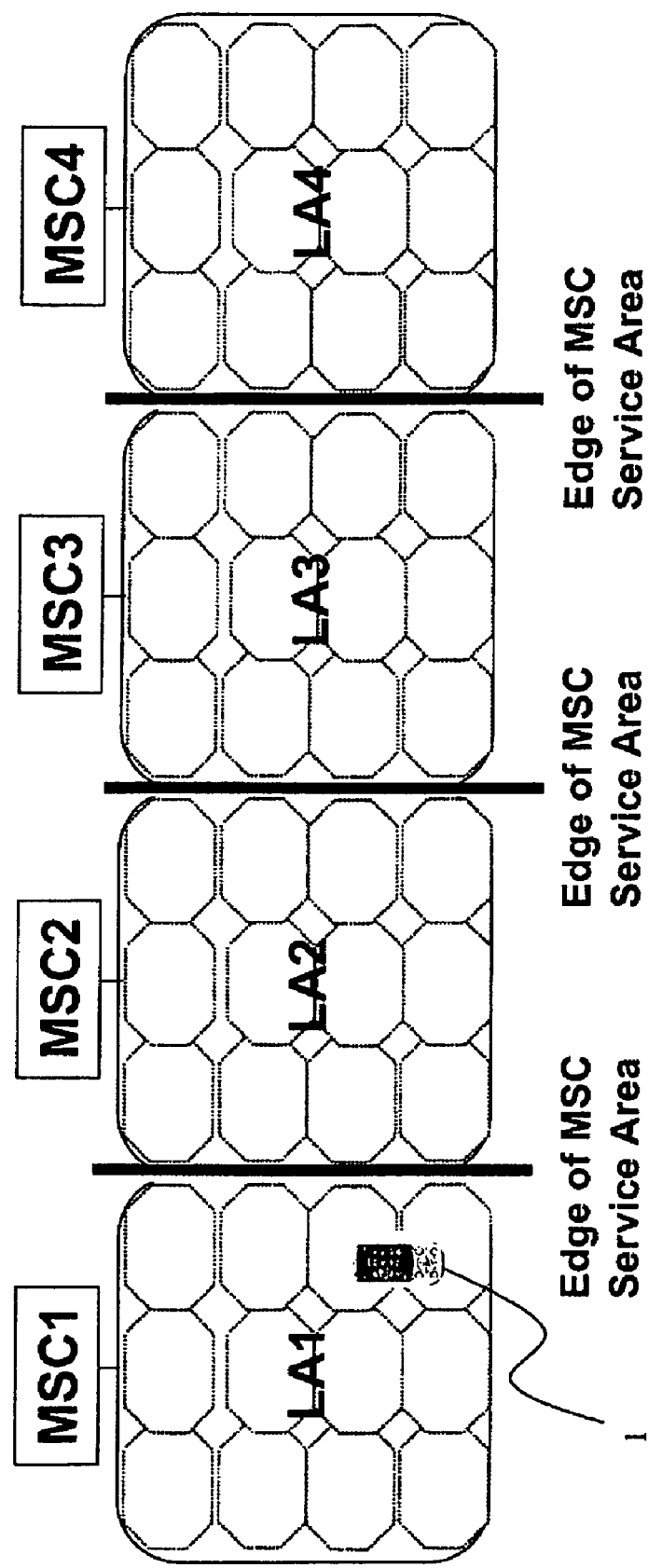
FIG. 1 illustrates schematically the architecture and principle of inter-MSC Handover.
Figure 2:
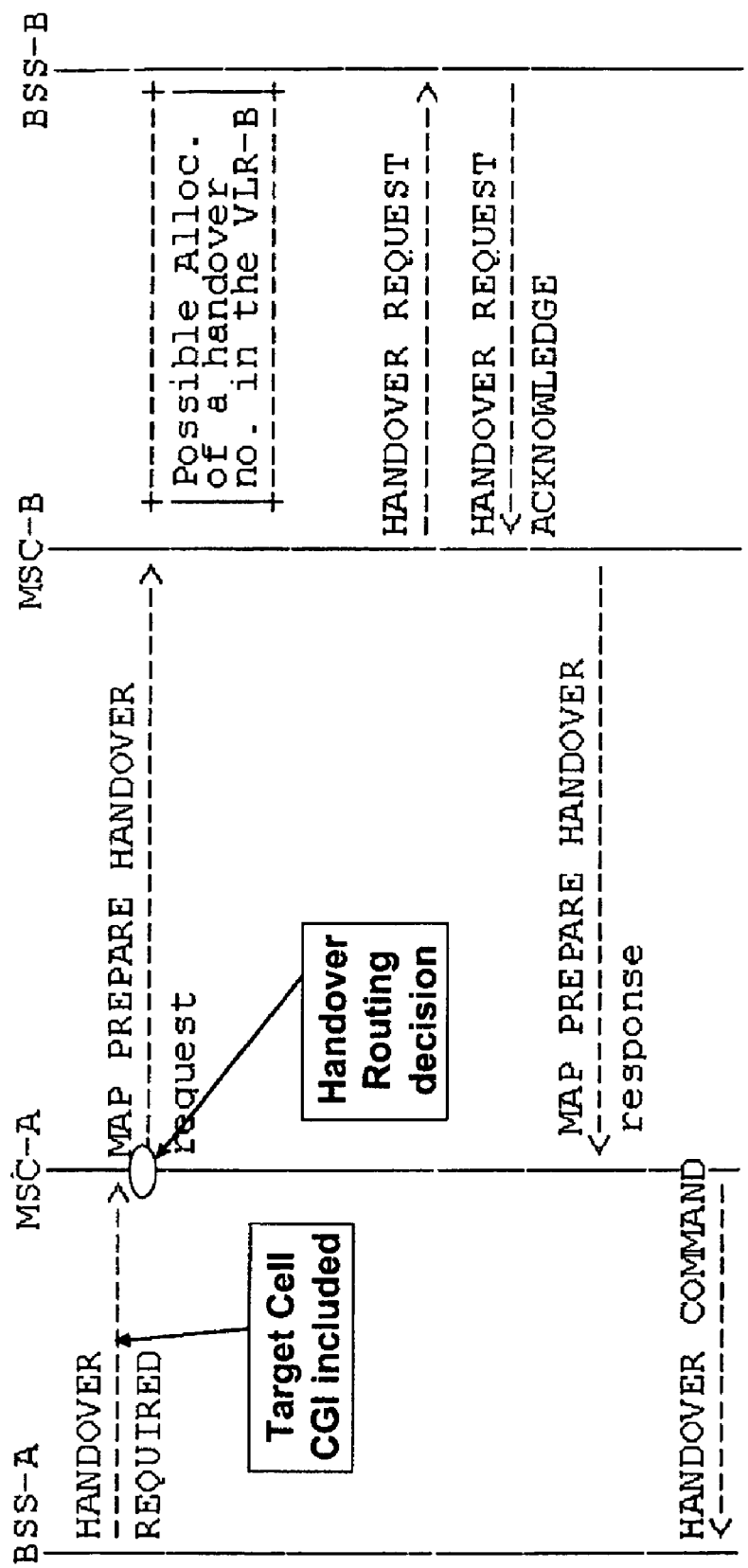
FIG. 2, is a signalling diagram showing Inter-MSC handover from a GERAN/GSM cell to another GERAN/GSM cell.
Figure 3:
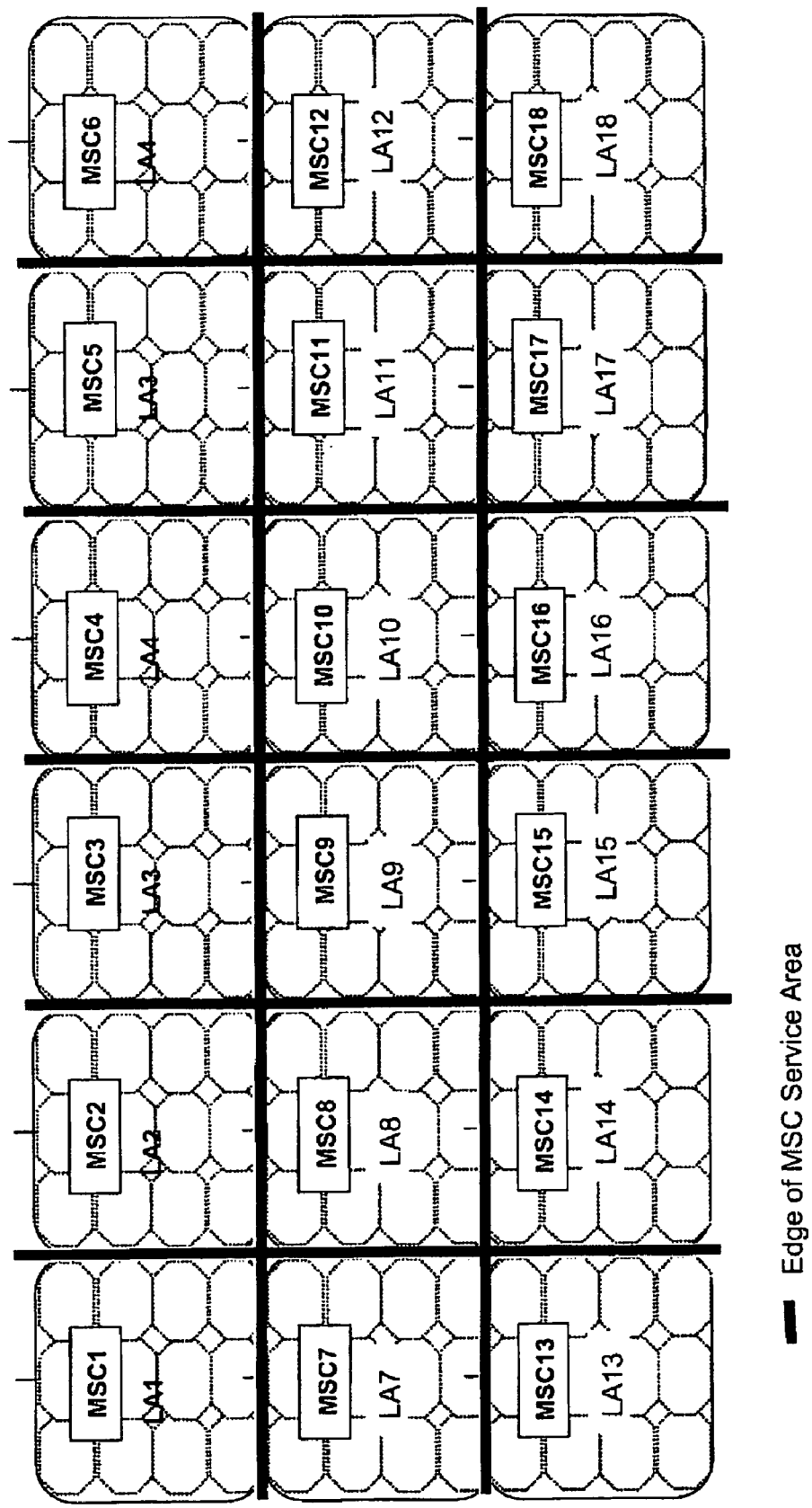
FIG. 3 illustrates schematically the coverage areas of several MSCs.
Figure 4:
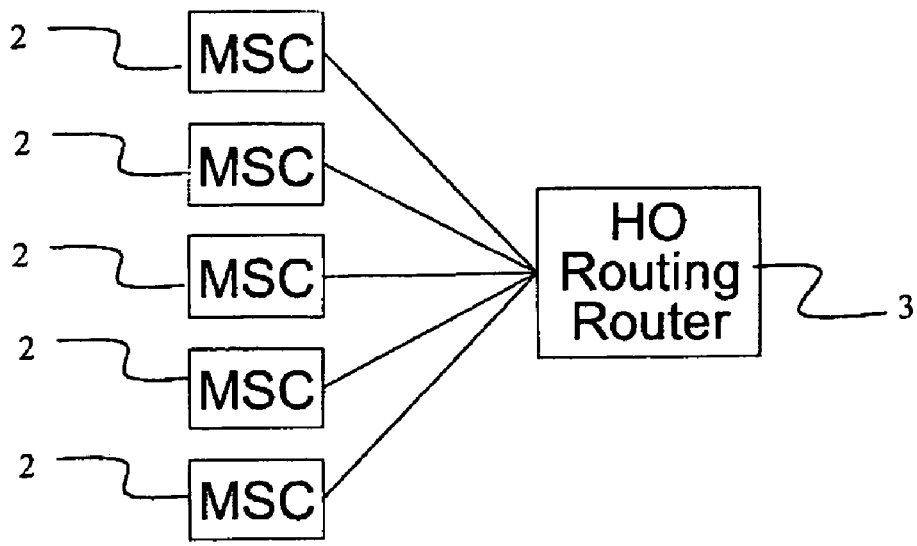
FIG. 4 illustrates schematically a network architecture when several MSCs are connected to a Handover Routing Router.
Figure 5:
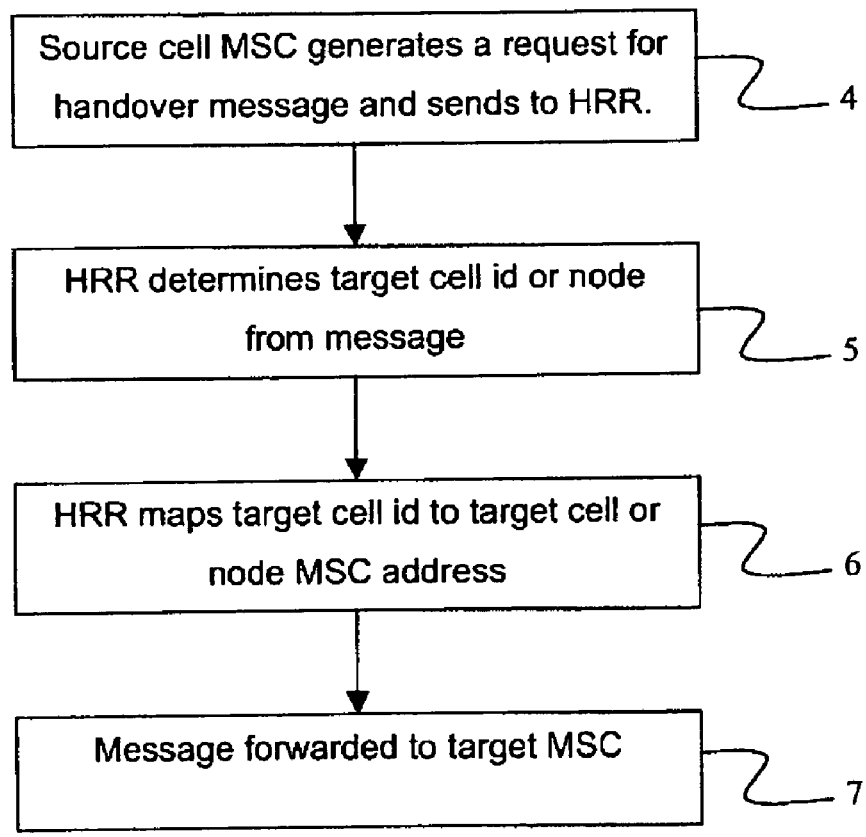
FIG. 5 is a flow diagram showing the steps of an embodiment of the invention.

Referring to FIG. 4, a plurality of MSCs 2 are functionally connected to a Handover Routing Router 3. Referring to FIG. 5, when it is determined that an inter-MSC handover is required for a mobile terminal, the source MSC to which the mobile terminal is attached sends 4 a "MAP PREPARE HANDOVER Request" message to a Handover Routing Router 3. The Handover Routing Router 3 analyzes the message, to obtain 5 the target cell or node identifier. The Handover Routing Router 3 uses the target cell or node identifier as the main input to determine 6 the address of target MSC for the Handover. This determination is made by mapping the target cell or node identifier to the address of the target MSC using a Handover Routing Table stored at the Handover Routing Router 3. The analysis is based on similar routing tables to those used in MSCs for routing, although the Handover Routing Router Handover Routing Table maps cell or node identifiers to MSCs for all MSCs in the network, and not just for adjacent MSCs. The Handover Routing Router 3 then forwards 7 the request to the target MSC for the Handover.

Each Handover Routing Router 3 is administered by a network operator, so each Public Land Mobile Network (PLMN) would have its own Handover Routing Router 3. In this way, information regarding cell structure and architecture within one network operator domain remains confidential and cannot be seen by other network operators that might use the network (i.e. other operators that have agreements that allow Inter-PLMN, and so Inter-MSC, handovers to be performed).

According to one embodiment of the invention, all requests for Handover are directed towards the Handover Routing Router 3. According to another embodiment, each MSC 2 in the network has a default Handover Route, which may be defined in the Handover Routing Table, which ensures that a request for Handover is only sent to the Handover Routing Router 3 if the source MSC does not have a target cell or node identifier and the corresponding target MSC in its Handover Routing Table. In this way, direct Handover Routing can still be used if required. If the received target cell or node in the anchor MSC is not specified in the Handover Routing Table in the MSC, then the "MAP PREPARE HANDOVER Request" message is forwarded to a default router for further analysis and routing. In this case, the default router is the Handover Routing Router 3 as defined by the default Handover Route.

Figure 6:
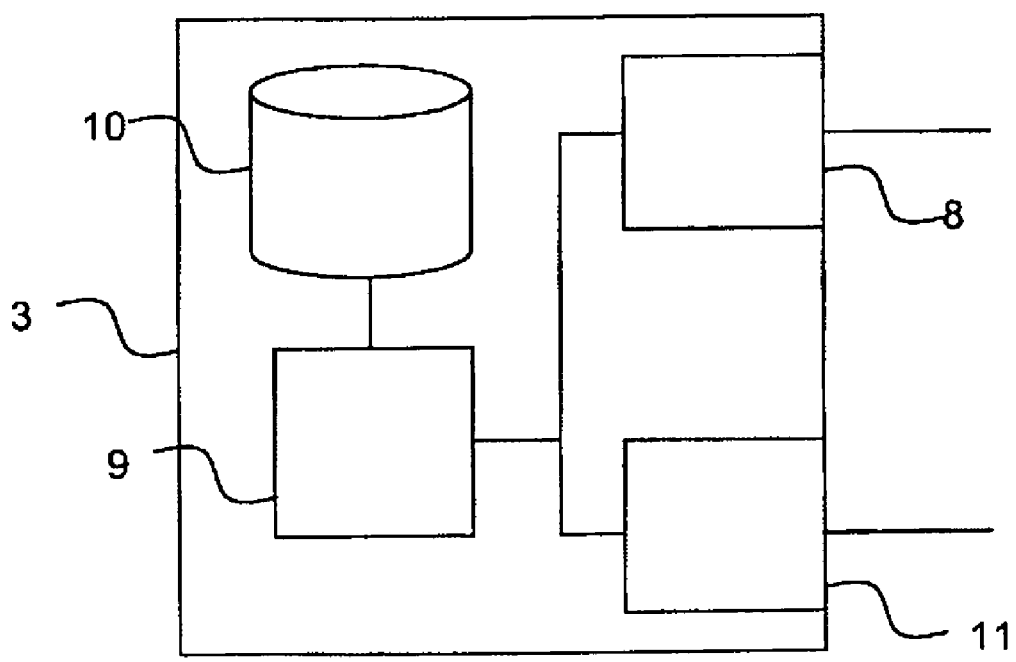
FIG. 6 illustrates schematically a Handover Routing Router.

Referring to FIG. 6 herein, there is illustrated schematically a Handover Routing Router 3. The Handover Routing Router 3 has a receiver 8 for receiving requests for handover from a source MSC. A processor 9 is used to analyse the requests using information from the Handover Routing Table stored in the memory 10. A transmitter 11 is used to transmit the request for handover to the target MSC.

The approach of using a Handover Routing Router 3 to deal with requests for inter-MSC Handovers simplifies the configuration of a network when new nodes are added to the network. For example, it is no longer necessary to update the Handover Routing Tables of existing MSCs, which serve cells adjacent to that served by the new node. Existing MSCs must be updated to allow them to use a Default Handover Route, that allows all handover requests to undefined target cells and target RAN controller nodes to be routed to the Handover Routing Router 3. Furthermore, there is no need to reveal cell planning information outside an operator's own PLMN.

Figure 7:
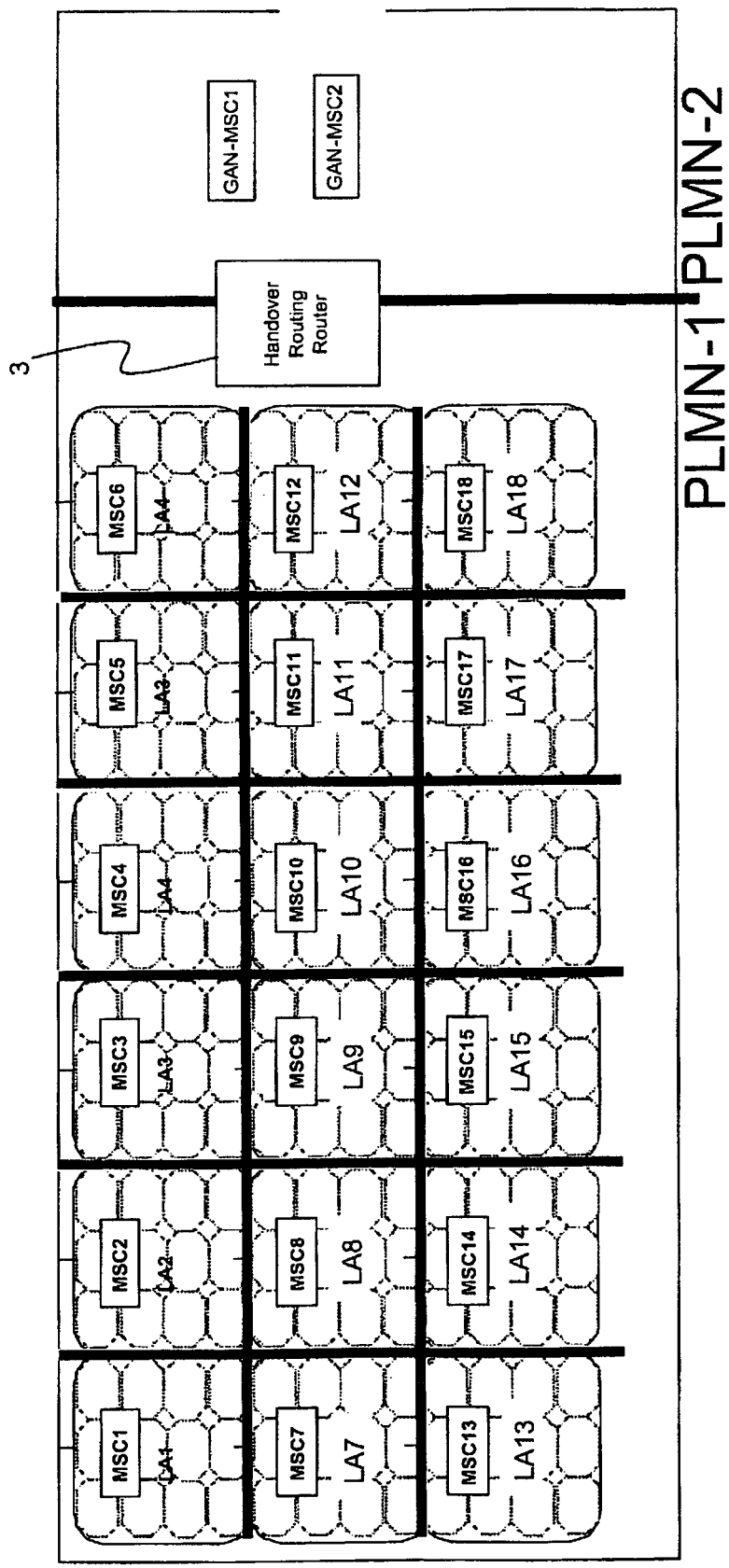
FIG. 7 illustrates an example network using a Handover Routing Router.

Referring to FIG. 7, there is illustrated an example network using a Handover Routing Router 3. In this example, a Generic Access Network (GAN) service is provided by PLMN-2, and wide area coverage is provided by PLMN-1. Without the invention, in order to perform a Handover, GAN-MSC1 would need to maintain the identities of all of the MSCs in PLMN-1 in its Handover Routing Table. If the operator of PLMN-1 chooses to re-arrange his network, the operator of PLMN-2 would need to update the Handover Routing Tables in the MSCs in PLMN-2.

However, according to the invention, the Handover Routing Router 3 is disposed between PLMN-1 and PLMN-2. In order for each operator to preserve proprietary information, the operator of PLMN-1 may operate one Handover Routing Router 3, and the operator of PLMN-2 may operate their own Handover Routing Router. For Handover from PLMN-1 to PLMN-2, the Handover Routing Router operated by the operator of PLMN-1 is used, and for handover from PLMN-2 to PLMN-1 Handover Routing Router operated by the network operator of PLMN-2 is used.

When a mobile user is handed over from a cell in PLMN-1 to a cell in PLMN-2, in which the target cells in the target network are not defined in the source network, a Default Handover Route is used for all undefined target cells. GAN-MSC1 and GAN-MSC2 define the address of the Handover Routing Router in order that handover can be performed. Similarly, the Handover Routing Router for PLMN-2 will be defined for a mobile user moving from PLMN-1 to PLMN-2.

In a further embodiment of the invention, in the case where a network has a pool of MSCs, then the Handover Routing Router can be used as a load balancer for inter-MSC handovers. Load balancing is performed by the Handover Routing Router when selecting the target MSC.

It will be appreciated by the person of skill in the art that various modifications may be made to the above described embodiments without departing from the scope of the present invention. For example, the principles described also apply to other type of handover procedures, e.g. packet switched (PS) handover procedures between source and target Serving GPRS Support Nodes (SGSN) of GSM and UMTS networks. The principles also apply to handover between different MME-nodes in LTE/SAE networks. The principles also apply to inter-eNodeB handovers in an LTE network. In this case, the HRR is used between a source eNodeB and a target eNodeB to route a handover request to the correct nodes.

The invention claimed is:

1. A method of handling handover of a mobile terminal in a mobile communications network, the communications network comprising a cellular radio access network and a core network, the handover from a source cell served by a source Mobile Switching Centre to a target cell or node served by a target Mobile Switching Centre, the method comprising:

at a Handover Routing Router, receiving a request for handover from the source Mobile Switching Centre;

at the Handover Routing Router, determining from the request an identity of the target cell or node, thereby obviating the need for the source Mobile Switching Centre to make such a determination;

at the Handover Routing Router, mapping the identity of the target cell or node to an address of the target Mobile Switching Centre, wherein the identity of the target cell or node is mapped to an address of the target Mobile Switching Centre using a Handover Routing Table, the Handover Routing Table containing data identifying cells, Radio Access Controller nodes, and Mobile Switching Centres in the core network;

forwarding the request for handover from the Handover Routing Router to the target Mobile Switching Centre;

at the source Mobile Switching Centre, determining whether a Mobile Switching Centre is defined in the Handover Routing Table for the target cell or node identifier;

if no Mobile Switching Centre is defined in the Handover Routing Table, sending the request for handover to the Handover Routing Router; and wherein the communications network has a full mesh Mobile Switching Centre configuration.

2. The method of handling handover of a mobile terminal according to claim 1, wherein the request for handover is sent as a MAP PREPARE HANDOVER Request message.

3. The method of handling handover of a mobile terminal according to claim 1, further comprising, when a new Mobile Switching Centre is added to the cellular core network, updating a Handover Routing Table with information identifying the new Mobile Switching Centre, the cells served by the new Mobile Switching Centre, and any Radio Access Network controller connected to the new Mobile Switching Centre.

4. A Handover Routing Router for use in a communications network, the Handover Routing Router comprising:
   a receiver for receiving, from a source Mobile Switching Centre, a request for handover from a source cell to a target cell in the radio access network;
   a processor for determining from the request an identity of the target cell or node, thereby obviating the need for the source Mobile Switching Centre to make such a determination;
   means for mapping the identity of the target cell or node to an address of a target Mobile Switching Centre, wherein the identity of the target cell or node is mapped to an address of the target Mobile Switching Centre using a Handover Routing Table, the Handover Routing Table containing data identifying cells, Radio Access Controller nodes, and Mobile Switching Centres in the core network;
   a transmitter for forwarding the request for handover from the Handover Routing Router to the target Mobile Switching Centre;
   wherein the source Mobile Switching Centre determines whether a Mobile Switching Centre is defined in the Handover Routing Table for the target cell or node identifier;
   the receiver further configured, if no Mobile Switching Centre is defined in the Handover Routing Table, for receiving the request for handover forwarded from the source Mobile Switching Centre; and
   wherein the communications network has a full mesh Mobile Switching Centre configuration.

5. The Handover Routing Router according to claim 4, wherein the Handover Routing Router is disposed at an interface between two Public Land Mobile Networks.

6. A source Mobile Switching Centre for use in a cellular radio access network, the Mobile Switching Centre comprising:
   a processor for preparing a message requesting handover of a mobile terminal to a target Mobile Switching Centre;
   a transmitter for sending the message to a Handover Routing Router, which determines from the message an identity of a target cell or node, thereby obviating the need for the Mobile Switching Centre to make such a determination;
   wherein the identity of the target cell or node is mapped, by the Handover Routing Router, to an address of the target Mobile Switching Centre using a Handover Routing Table, the Handover Routing Table containing data identifying cells, Radio Access Controller nodes, and Mobile Switching Centres in the core network;
   wherein the request for handover is forwarded from the Handover Routing Router to the target Mobile Switching Centre;
   the processor further configured for determining whether a Mobile Switching Centre is defined in the Handover Routing Table for the target cell or node identifier;
   the transmitter further configured, if no Mobile Switching Centre is defined in the Handover Routing Table, for sending the request for handover to the Handover Routing Router; and
   wherein the communications network has a full mesh Mobile Switching Centre configuration.

7. The Mobile Switching Centre for use in a cellular radio access network as claimed in claim 6, comprising:
   a memory for storing a list of cell and node identifiers and target Mobile Switching Centre identifiers; and
   means for, prior to sending the message, determining that a cell or node identifier for a required target cell is not stored in the memory.

* * * * *